United States Patent
Cui et al.

(10) Patent No.: US 10,346,065 B2
(45) Date of Patent: *Jul. 9, 2019

(54) METHOD FOR PERFORMING HOT-SWAP OF A STORAGE DEVICE IN A VIRTUALIZATION ENVIRONMENT

(71) Applicant: Nutanix, Inc., San Jose, CA (US)

(72) Inventors: Miao Cui, New York, NY (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,010

(22) Filed: Jan. 23, 2017

(65) Prior Publication Data

US 2017/0131928 A1    May 11, 2017

Related U.S. Application Data

(63) Continuation of application No. 14/144,486, filed on Dec. 30, 2013, now Pat. No. 9,552,211.

(60) Provisional application No. 61/785,363, filed on Mar. 14, 2013.

(51) Int. Cl.
| | |
|---|---|
| *G06F 11/00* | (2006.01) |
| *G06F 3/06* | (2006.01) |
| *G06F 9/455* | (2018.01) |
| *G06F 9/4401* | (2018.01) |

(52) U.S. Cl.
CPC .......... *G06F 3/0619* (2013.01); *G06F 3/0665* (2013.01); *G06F 3/0689* (2013.01); *G06F 9/4408* (2013.01); *G06F 9/45558* (2013.01); *G06F 2009/45575* (2013.01); *G06F 2009/45579* (2013.01); *G06F 2009/45583* (2013.01)

(58) Field of Classification Search
USPC ........................................................ 714/6.3
See application file for complete search history.

(56) References Cited

U.S. PATENT DOCUMENTS

| | | | |
|---|---|---|---|
| 7,222,150 B1 | 5/2007 | Phillips et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,552,211 B1 | 1/2017 | Cui et al. | |
| 9,772,866 B1 | 9/2017 | Aron et al. | |
| 2009/0158081 A1* | 6/2009 | Dake ................... | G06F 11/2028 714/3 |
| 2011/0023031 A1 | 1/2011 | Bonola et al. | |

(Continued)

OTHER PUBLICATIONS

Non-Final Office Action dated Oct. 7, 2015 for related U.S. Appl. No. 14/144,486.

(Continued)

*Primary Examiner* — Sarai E Butler
(74) *Attorney, Agent, or Firm* — Vista IP Law Group, LLP

(57) ABSTRACT

Performing a hot-swap of a storage device for a node in a virtualization environment having a plurality of storage devices, includes performing pass-thru of a storage manager managing the plurality of storage devices to a service virtual machine, such that the service virtual machine communicates with the plurality of storage devices without going through a storage software layer of its corresponding hypervisor, booting the hypervisor from a device other than the plurality of storage devices and performing the hot-swap of the storage device.

20 Claims, 10 Drawing Sheets

(56) References Cited

U.S. PATENT DOCUMENTS

| | | | |
|---|---|---|---|
| 2011/0087874 A1 | 4/2011 | Timashev et al. | |
| 2013/0055254 A1 | 2/2013 | Avasthi et al. | |
| 2013/0179733 A1 | 7/2013 | Frank et al. | |
| 2013/0339947 A1* | 12/2013 | Neary | G06F 9/45558 718/1 |
| 2016/0147554 A1* | 5/2016 | Simoncelli | G06F 9/45558 718/1 |
| 2016/0147558 A1* | 5/2016 | Gaponenko | G06F 8/63 718/1 |
| 2016/0179635 A1* | 6/2016 | Kondalsamy | G06F 11/203 714/4.12 |

OTHER PUBLICATIONS

Non-Final Office Action dated Mar. 8, 2016 for related U.S. Appl. No. 14/144,486.

Notice of Allowance and Fee(s) Due dated Sep. 8, 2016 for related U.S. Appl. No. 14/144,486.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

\* cited by examiner

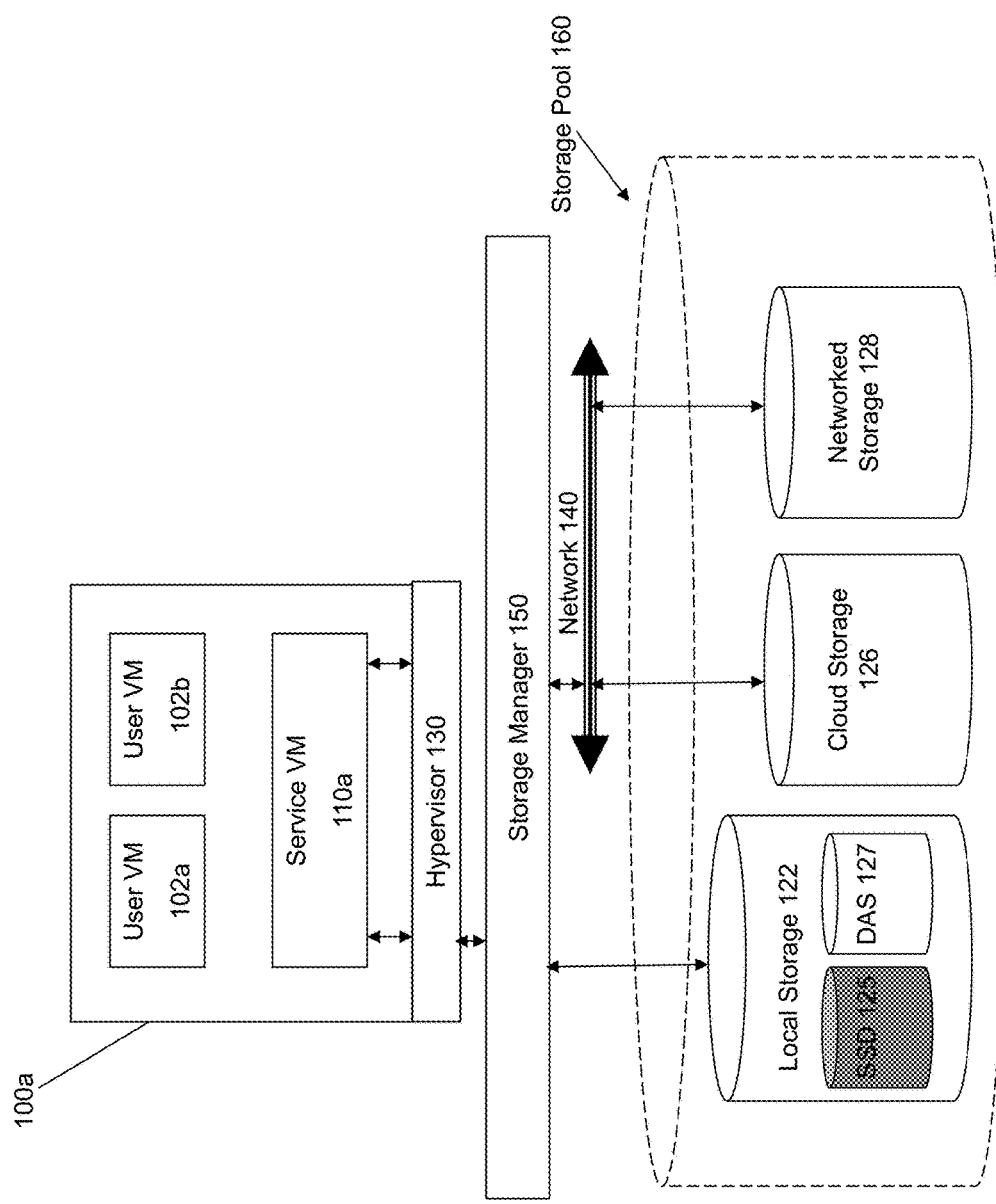

METHOD FOR PERFORMING HOT-SWAP OF A STORAGE DEVICE IN A VIRTUALIZATION ENVIRONMENT

CROSS-REFERENCE TO RELATED APPLICATIONS

This present application is a continuation of U.S. Pat. No. 9,552,211, filed on Dec. 30, 2013 and claims the benefit of U.S. Provisional Application No. 61/785,363, filed Mar. 14, 2013, which is hereby incorporated by reference in its entirety.

FIELD OF THE INVENTION

This disclosure concerns a method for performing a hot-swap of a storage device in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Virtualization environments may be implemented to perform I/O and storage device management. One type of architecture for managing I/O and storage for a virtualization environment is described in application Ser. No. 13/207,345. This architecture employs a service VM that sits above the hypervisor to control and manage any type of storage device, including direct-attached storage in addition to network-attached and cloud-attached storage. The term service VM may also be referred to herein as Controller VM. The Service VM implements the Storage Controller logic in the user space, and with the help of other Service VMs in a cluster, virtualizes all storage hardware as one global resource pool that is high in reliability, availability, and performance. IP-based requests are used to send I/O request to the Service VMs. The Service VM can directly implement storage and I/O optimizations within the direct data access path, without the need for add-on products.

When a storage device needs to be replaced while the virtualization environment is still in operation, issues may arise leading to the inoperability of the virtualization environment. Replacing a storage device while the virtualization environment is still in operation is known as "hot-swapping". Hot-swapping a storage device may be necessary when the storage device incurs an error or fails for any other reason during operation of the virtualization environment. However, when a storage device is removed while the virtualization environment is still in operation, the hypervisor supporting the virtual machines of the virtualization environment may be unable to continue operating correctly causing various errors to occur leading to undesirable behavior in the virtualization environment. Because a service VM accesses the storage devices through the hypervisor, the service VM may be unable to accurately perform its I/O and storage management functions when its corresponding hypervisor begins to misbehave due to a storage device being removed while the virtualization environment is still in operation.

Therefore, there is a need for a method for performing a hot-swap of a storage device in a virtualization environment.

SUMMARY

Embodiments of the present invention provide a method for performing a hot-swap of a storage device in a virtualization environment. According to some embodiments, performing a hot-swap of a storage device for a node in a virtualization environment having a plurality of storage devices, involves performing pass-thru of a storage manager managing the plurality of storage devices to a service virtual machine, such that the service virtual machine communicates with the plurality of storage devices without going through a storage software layer of its corresponding hypervisor, booting the hypervisor from a device other than the plurality of storage devices and performing the hot-swap of the storage device.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 5A to 5D illustrate a method for performing a hot-swap of a storage device in a virtualization environment according to some embodiments of the invention.

DETAILED DESCRIPTION

Embodiments of the present invention provide a method for performing a hot-swap of a storage device in a virtualization environment. According to some embodiments, hot-swapping a storage device in a virtualization environment is accomplished by performing pass-thru of a storage manager to a service virtual machine, such that the service virtual machine communicates with storage devices without going through a hypervisor, booting the hypervisor from a device other than the storage devices, and performing the hot-swap of the storage device.

Figure 1:
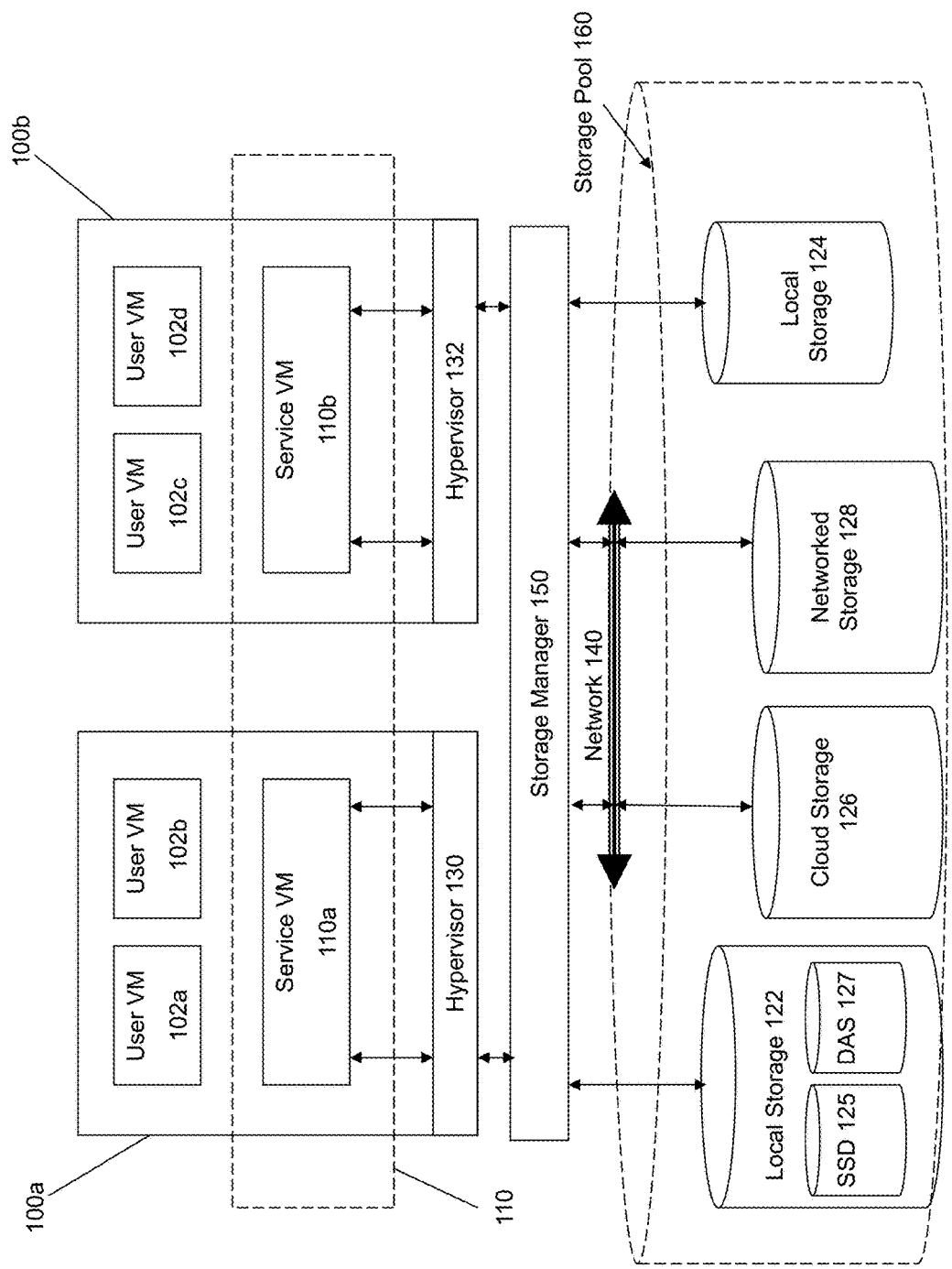
FIG. 1 illustrates an example architecture to implement I/O and storage device management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers/nodes 100a and 100b that manages multiple-tiers of storage. The multiple tiers of storage include storage that is accessible through a network 140, such as cloud storage 126 or networked storage 128 (e.g., a SAN or "storage area network"). The present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". The term "Service VM" may also be referred to herein as a "Controller VM". This is the "Storage Controller" in the currently described architecture. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor. As illustrated in FIG. 1, the Service VMs 110a and 110b initially communicate with the storage pool 160 through their respective hypervisors 130, 132. The storage pool 160 may be controlled by a storage manager 150, which the hypervisors 130/132 communicate with to facilitate storage and I/O activities. A storage software layer (not shown) in the hypervisor 130/132 may be used to communicate with the storage pool 160.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QOS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

When a storage device from the storage pool 160 needs to be replaced while the nodes 100*a*/100*b* of the virtualization environment are still in operation, issues may arise leading to the inoperability of the nodes 100*a*/100*b* within virtualization environment. Replacing a storage device from the storage pool 160 while the nodes 100*a*/100*b* of the virtualization environment are still in operation is known as "hot-swapping". Hot-swapping a storage device may be necessary when the storage device incurs an error or fails for any other reason during operation of the virtualization environment. However, when a storage device from the storage pool 160 is removed while the nodes 100*a*/100*b* of the virtualization environment are still in operation, the hypervisors 130/132 supporting the virtual machines within a node 100*a*/100*b* of the virtualization environment may be unable to continue operating correctly causing various errors to occur leading to undesirable behavior in the virtualization environment. Because a service VM 110*a*/110*b* accesses the storage devices in the storage pool 160 through its respective hypervisor 130/132, the service VM 110*a*/110*b* may be unable to accurately perform its I/O and storage management functions when its corresponding hypervisor 130/132 begins to misbehave due to a storage device of the storage pool 160 being removed while the nodes 100*a*/100*b* of the virtualization environment are still in operation.

Figure 2:
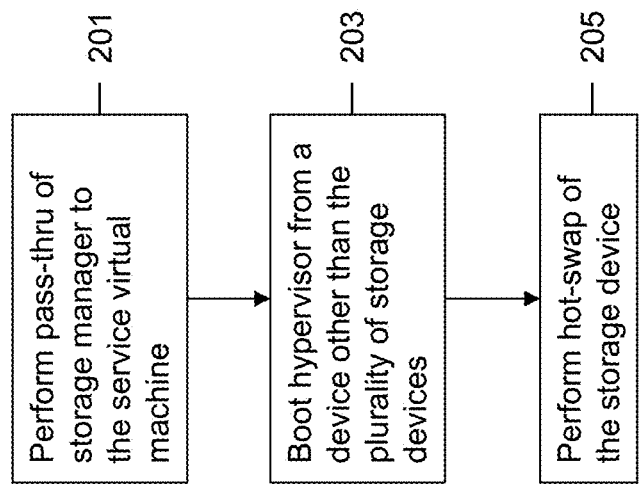
FIG. 2 is a flow chart illustrating a method for performing a hot-swap of a storage device in a virtualization environment according to some embodiments of the invention.

FIG. 2 is a flow chart illustrating a method for performing a hot-swap of a storage device in a virtualization environment according to some embodiments of the invention. For purposes of simplicity, the method described in FIG. 2 will be made with reference to a single node in the virtualization environment. It is important to note, however, that the method for performing a hot-swap of a storage device in a virtualization environment may be implemented in any number of nodes making up the virtualization environment.

Initially, pass-thru of the storage manager residing in the virtualization environment to the service virtual machine is performed as shown at 201. Pass thru involves first configuring a driver of the service virtual machine to support communication with the plurality of storage devices through the storage manager without having to go through the storage software layer of its respective hypervisor. Information is then obtained by the service virtual machine to allow for communication with the plurality of storage devices through the storage manager. For example, the service virtual machine may obtain information identifying the location of the plurality of storage devices or information identifying the storage manager managing the plurality of storage devices. Once the driver of the service virtual machine has been configured and information has been obtained, the service virtual machine may begin communicating with the plurality of storage devices without going through its respective hypervisor.

In some embodiments, where the plurality of storage devices are connected to the nodes through a storage manager on the PCIe bus, performing pass-thru of the storage manager to the service virtual machine may involve performing a PCIe pass-thru of the storage manager.

At this point, the hypervisor is no longer in communication with the plurality of storage devices or the storage manager managing the plurality of storage devices. The service VM is then free to communicate with the plurality of storage devices without having to go through its respective hypervisor.

Once the hypervisor is no longer in communication with the plurality of storage devices, it is booted up from a device other than the plurality of storage devices as shown at 203. The hypervisor is not booted up from any of the plurality of storage devices because that would require the hypervisor to be in communication with the plurality of storage devices which would lead to inoperability once a storage device of the plurality of storage devices is hot-swapped. Instead the hypervisor is booted up from a device other than the plurality of storage devices, such that hot-swapping of a storage device of the plurality of storage devices may occur without causing the hypervisor to malfunction.

In some embodiments, the hypervisor may be booted up from a universal serial bus (USB) device. In some other embodiments, the hypervisor may be booted up from any other device that supports hypervisor boot-up.

Booting up the hypervisor from a device other than the plurality of storage devices may involve initially connecting the device to the node that the hypervisor resides. The BIOS of the hypervisor may then be configured to boot from the device rather than from the plurality of storage devices. The hypervisor may then be booted up using the device rather than the plurality of storage devices.

After pass-thru has been performed and the hypervisor has been booted-up from a device other than the plurality of storage devices, a hot-swap of a storage device of the plurality of storage devices may be performed as shown at 205. The service VM is capable of maintaining normal operation during a hot-swap of storage devices, and as such is unaffected by the hot-swap of the storage device now that it can communicate with the plurality of storage devices without going through the hypervisor. The hypervisor is no longer in communication with the plurality of storage devices, and as such is unaffected by the hot-swap of a storage device of the plurality of storage devices and therefore cannot cause its respective service VM to misbehave due to hot-swapping of the storage device.

By performing pass-thru followed by booting the hypervisor from a device other than the plurality of storage devices, hot-swap of a storage device may be accomplished during operation of the virtualization environment while still allowing the service VM to accurately perform its I/O and storage management functions.

Figure 3:
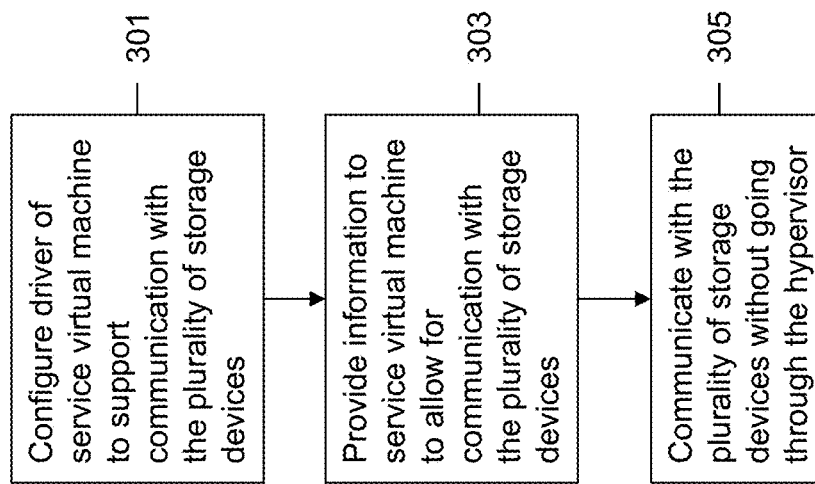
FIG. 3 is a flow chart illustrating a method for performing pass-thru of storage devices to a service virtual machine according to some embodiments of the invention.

FIG. 3 is a flow chart illustrating a method for performing pass-thru of a storage manager to a service virtual machine according to some embodiments of the invention. Initially a driver of the service virtual machine is configured to support communication with the plurality of storage devices through the storage manager without having to go through its respective hypervisor as shown at 301. Configuring the driver of the service virtual machine may involve substituting a driver that corresponds to the storage environment exported by the hypervisor with a driver that corresponds to the plurality of storage devices or the storage manager managing the plurality of storage devices. The service virtual machine is now capable of communicating with the plurality of storage devices without having to go through its respective hypervisor.

Next, information is obtained by the service virtual machine to allow for communication with the plurality of storage devices as shown at 303. For example, the service virtual machine may obtain information identifying the location of the plurality of storage devices such that it knows where to contact the storage devices or information identifying the storage manager managing the plurality of storage devices.

Once the driver of the service virtual machine has been configured and information has been obtained, the service virtual machine may begin to communicate with the plurality of storage devices without going through the hypervisor as shown at 305. By performing pass-thru of the storage manager and allowing the service virtual machine to communicate with the plurality of storage devices through the storage manager without having to go through its respective hypervisor, any undesirable behavior of the service virtual machine caused by hypervisor inoperability due to hot-swapping of a storage device may be avoided. The service VM is capable of maintaining normal operation during a hot-swap of storage devices, and as such is unaffected by the hot-swap of the storage device now that it can communicate with the plurality of storage devices without going through the hypervisor.

Figure 4:
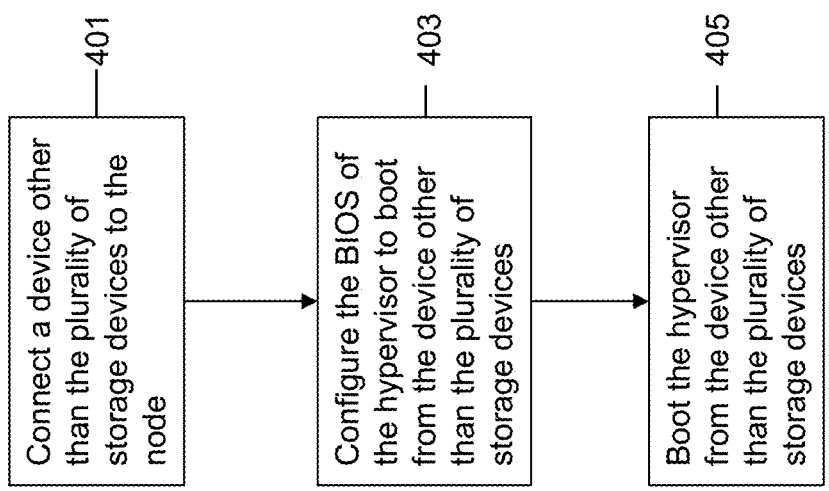
FIG. 4 is a flow chart illustrating a method for booting a hypervisor from a device other than the storage devices in the virtualization environment according to some embodiments of the invention.

FIG. 4 is a flow chart illustrating a method for booting a hypervisor from a device other than the storage devices in the virtualization environment according to some embodiments of the invention.

Initially a device other than the plurality of storage devices is connected to the node on which the hypervisor resides as shown at 401. The hypervisor cannot be booted up from any of the plurality of storage devices because that would require the hypervisor to be in communication with the plurality of storage devices which would lead to inoperability once a storage device of the plurality of storage devices is hot-swapped. Instead the hypervisor is booted up from a device other than the plurality of storage devices, such that hot-swapping of a storage device of the plurality of storage devices may occur without causing the hypervisor to malfunction.

In some embodiments, the hypervisor may be booted up from a universal serial bus (USB) device. In some other embodiments, the hypervisor may be booted up from any other device that supports hypervisor boot-up.

The BIOS of the hypervisor may then be configured to boot from the device rather than from the plurality of storage devices as shown at 403. For example, the BIOS of the hypervisor may initially be set to boot from the plurality of storage devices when initializing the virtual environment and then reset to boot from the device other than the plurality of storage devices when hot-swapping of a storage device is to occur.

The hypervisor may then be booted up using the device rather than the plurality of storage devices as shown at 405. Once the hypervisor has been booted up using the device rather than the plurality of storage devices, the hypervisor is no longer in communication with the plurality of storage devices, and as such is unaffected by the hot-swap of a storage device of the plurality of storage devices.

FIGS. 5A to 5D illustrate a method for performing a hot-swap of a storage device in a virtualization environment according to some embodiments of the invention. The virtualization environment in FIGS. 5A to 5D is substantially similar to the virtualization environment depicted in FIG. 1, however for purposes of simplicity, only a single node 100a is illustrated.

In FIG. 5A, the solid state drive 125 of the local storage 122 connected to the node has failed and needs to be hot-swapped while the virtualization environment remains in operation. Initially, the service VM 110a residing on the node 100a communicates with the plurality of storage devices 160 through a storage software layer of its respective hypervisor 130. However, because one of the storage devices 125 has failed, it is necessary to perform the method for hot-swapping the storage device 125 described above in FIGS. 2-4.

The method begins by first performing pass-thru of the storage manager 150 residing in the virtualization environment to the service virtual machine 110a. As mentioned above, pass thru involves first configuring a driver (not shown) of the service virtual machine 110a to support communication with the plurality of storage devices 160 through the storage manager 150 without having to go through its respective hypervisor 130. Information is then obtained by the service virtual machine 110a to allow for communication with the plurality of storage devices 160. Once the driver of the service virtual machine 110a has been configured and information has been obtained, the service virtual machine 110a may begin communicating with the plurality of storage devices 160 through the storage manager 150 without going through its respective hypervisor 130.

Figure 5B:
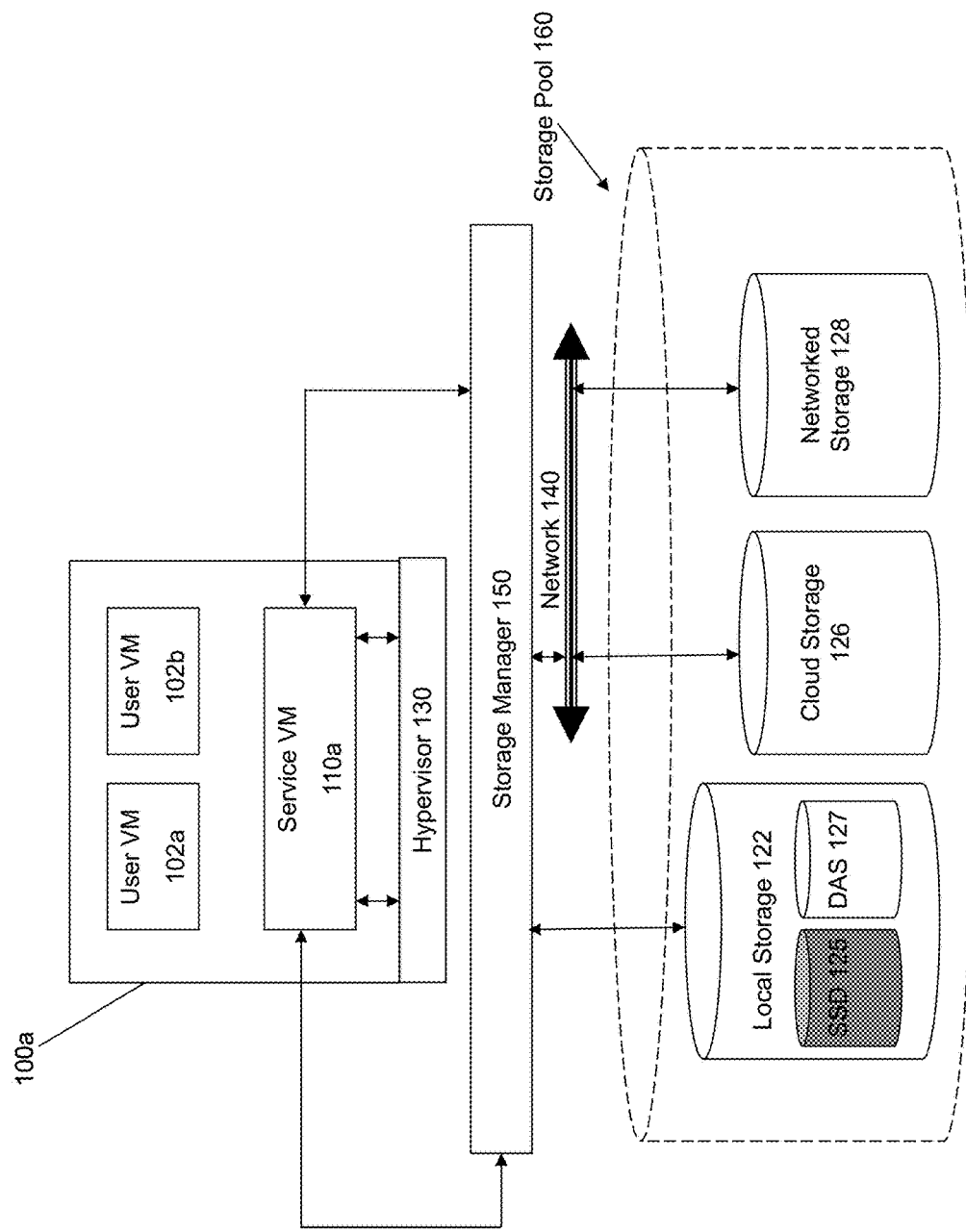

The virtualization environment after pass-thru has been performed is illustrated in FIG. 5B. At this point, the hypervisor 130 is no longer in communication with the plurality of storage devices 160 and the service VM 110a is free to communicate with the plurality of storage devices 160 without having to go through its respective hypervisor 130.

Figure 5C:
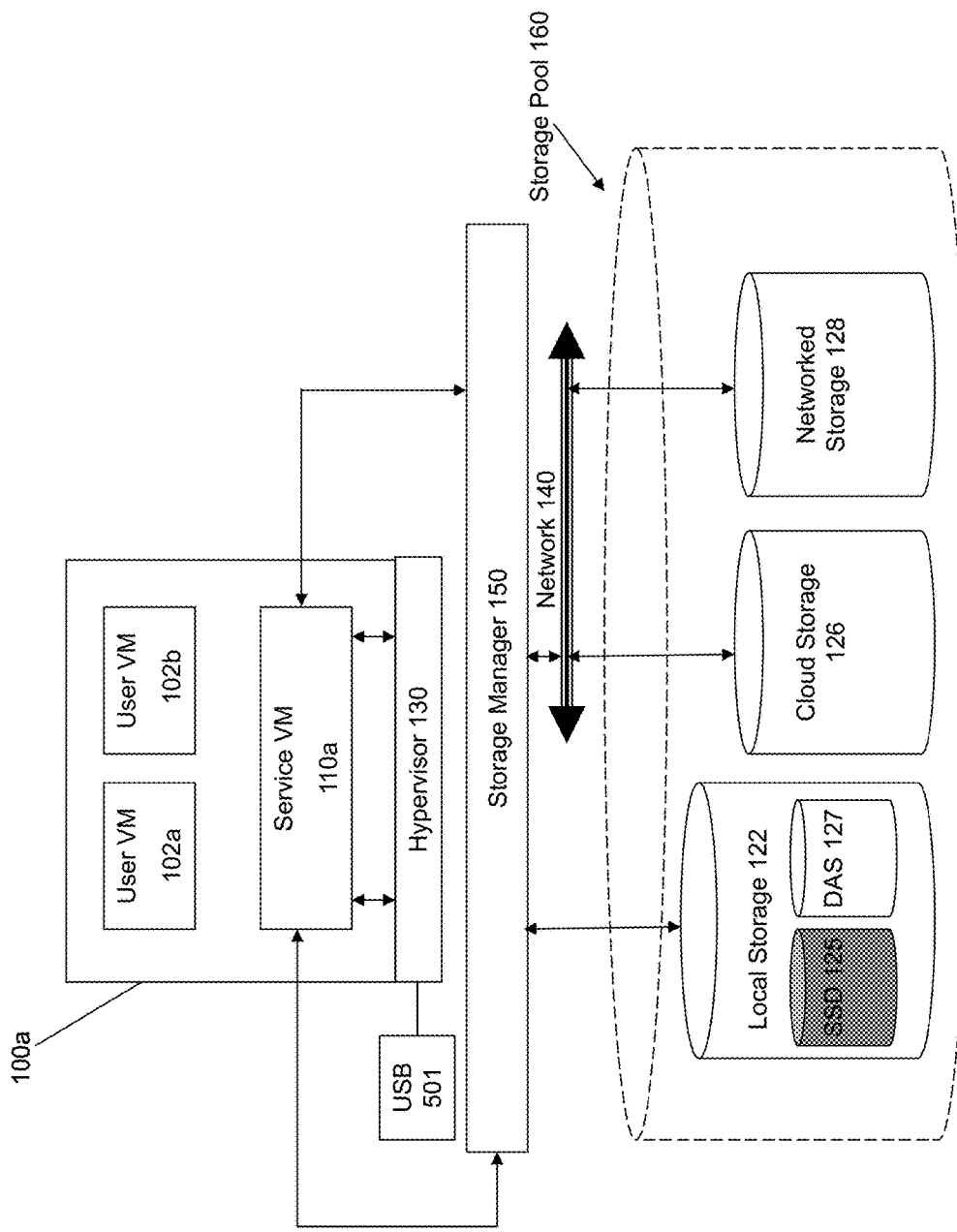

Once the hypervisor 130 is no longer in communication with the plurality of storage devices 160, it needs to be booted up from a device 501 other than the plurality of storage devices as illustrated in FIG. 5C. The hypervisor 130 cannot be booted up from any of the plurality of storage devices 160 because that would require the hypervisor 130 to be in communication with the plurality of storage devices 160 which would lead to inoperability once a storage device 125 of the plurality of storage devices 160 is hot-swapped. Instead, the hypervisor 130 is booted up from a device 501 other than the plurality of storage devices 160, such that hot-swapping of a storage device 125 of the plurality of storage devices 160 may occur without causing the hypervisor to malfunction.

In some embodiments, the hypervisor 130 may be booted up from a universal serial bus (USB) device 501 as illustrated in FIG. 5C. In some other embodiments, the hypervisor 130 may be booted up from any other device that supports hypervisor boot-up.

As already mentioned above, booting up the hypervisor 130 from a device 501 other than the plurality of storage devices 160 may involve initially connecting the device 501 to the node 100a that the hypervisor 130 resides and then configuring the BIOS of the hypervisor 130 to boot from the device 501 rather than from the plurality of storage devices 160. The hypervisor 130 may then be booted up using the device 501 rather than the plurality of storage devices 160.

Figure 5D:
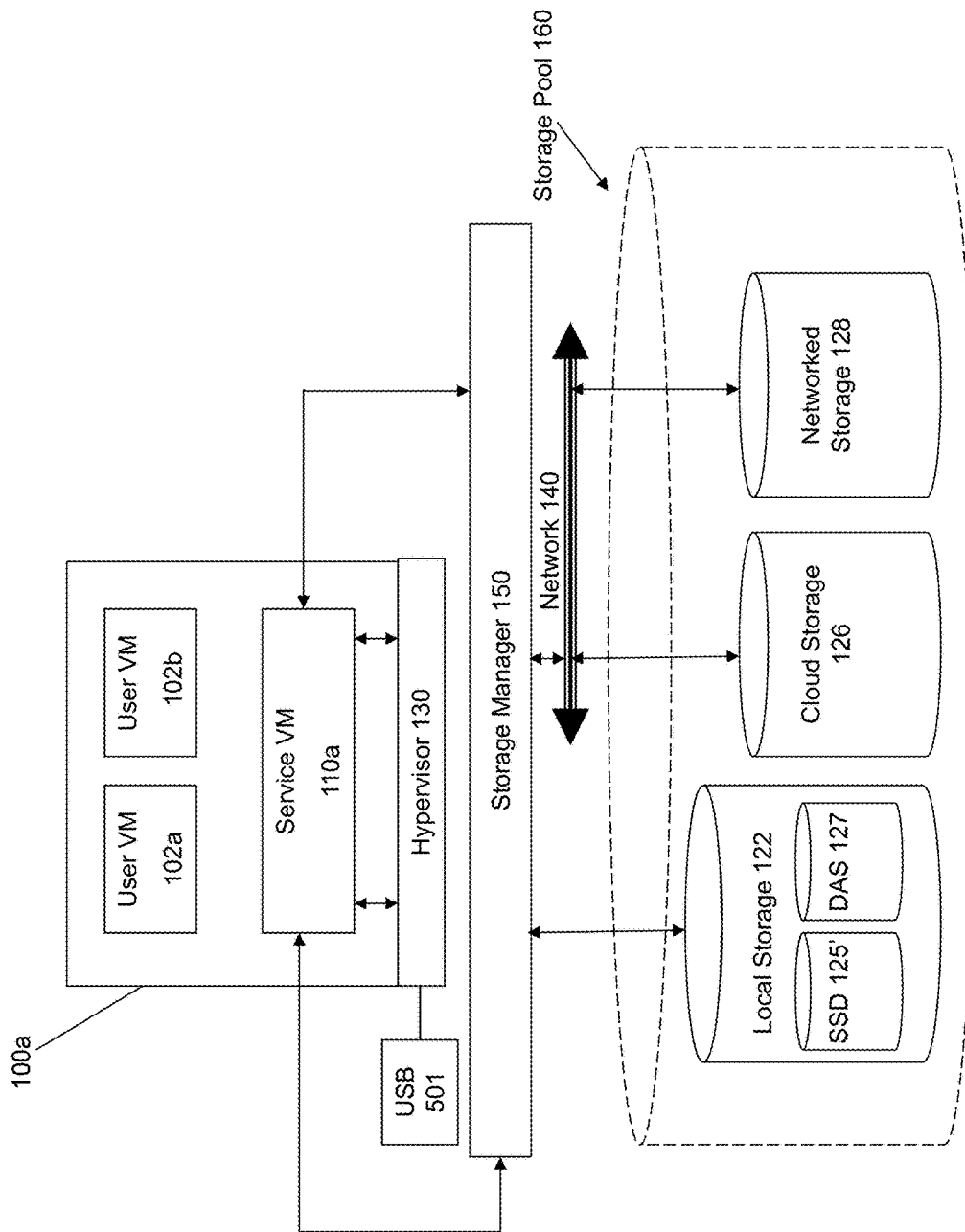

After pass-thru has been performed and the hypervisor 130 has been booted-up from a device 501 other than the plurality of storage devices 160, a hot-swap of the storage device 125 with another storage device 125' may be performed as illustrated in FIG. 5D. The service VM 110a is capable of maintaining normal operation during the hot-swap of storage devices, and as such is unaffected by the hot-swap storage device now that it can communicate with the plurality of storage devices 160 without going through the hypervisor 130. The hypervisor 130 is no longer in communication with the plurality of storage devices 160, and as such is also unaffected by the hot-swap of storage devices.

By performing pass-thru followed by booting the hypervisor from a device other than the plurality of storage devices, hot-swap of a storage device may be accomplished during operation of the virtualization environment while still allowing the service VM to accurately perform its I/O and storage management functions.

In some situations, the hypervisor cannot directly support virtual machines including the service VM within a virtualization environment using the device (e.g., USB device) other than the plurality of storage devices used to boot-up the hypervisor. This is because the hypervisor boot up device (e.g., USB device) may not be suitable for hosting virtual machines. In such situations, it is necessary to emulate a suitable storage device from a local memory of the node on which the hypervisor resides such that the hypervisor can support virtual machines when it is booted from a device that is not suitable for hosting virtual machines.

Figure 6:
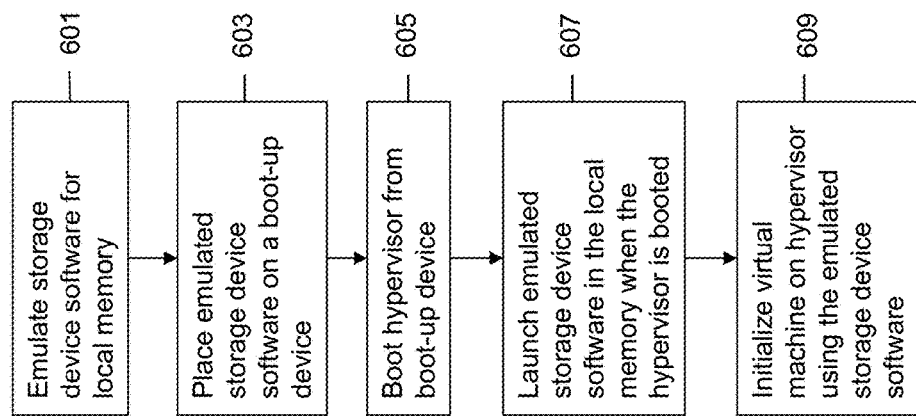
FIG. 6 is a flow chart illustrating a method for creating a virtualization environment using a local memory according to some embodiments of the invention.

FIG. 6 is a flow chart illustrating a method for creating a virtualization environment using a local memory according to some embodiments of the invention.

Initially, software for a suitable storage device is emulated for a local memory as shown at 601. Emulating a storage device for a local memory involves imitating a storage device environment to be run on a local memory rather than on an external storage device. In some embodiments, the emulated storage device is a network file system (NFS) storage device or a common internet file system (CIFS) storage device. In some other embodiments, the emulated storage device is an internet small computer system interface (iSCSI) storage device.

The emulated storage device software is then placed on the device used to boot-up the hypervisor as shown at 603. For example, when the device used to boot-up the hypervisor is a USB device, the emulated storage device may be placed on the USB device.

The hypervisor is then booted up from the boot-up device as shown at 605. The hypervisor is booted up from the boot-up device as described above with respect to FIGS. 2 and 3.

The emulated storage device software is then launched in the local memory of the node within which the hypervisor resides when the hypervisor is booted up as shown at 607. Launching the emulated storage device software within the local memory may involve copying the emulated storage device software from the boot-up device to the local memory within which the hypervisor resides, and then initializing the emulated storage device software from the local memory. Once the emulated storage device software has been launched within the local memory, the emulated storage device software provides the hypervisor with the functionality necessary to support virtual machines.

Virtual machines may then be initialized/supported on the hypervisor using the emulated storage device as shown at 609. By emulating a storage device in a local memory of the node within which a hypervisor resides, the hypervisor may implement a virtualization environment capable of supporting virtual machines when the boot-up device is not suitable for hosting virtual machines.

It is important to note that the method described with respect to FIG. 6 for creating a virtualization environment using a local memory according to some embodiments of the invention may be used outside of the context of hot-swapping. For example, a storage device may be emulated on a local memory of a node for supporting virtual machines within a virtualization environment such that no external storage devices are required regardless of whether or not hot-swapping of storage disks occurs.

System Architecture

Figure 7:
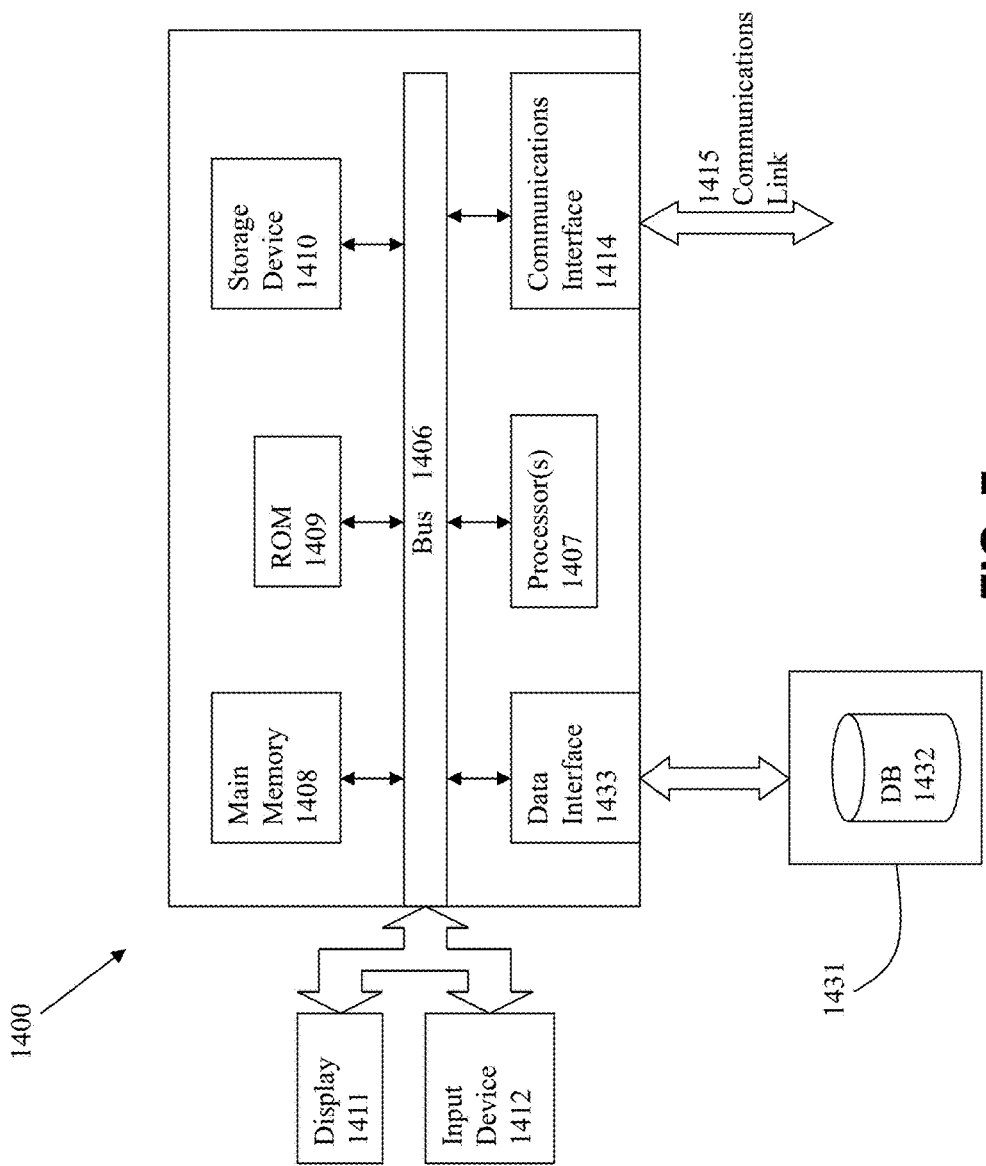
FIG. 7 is a block diagram of a computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for maintaining access to a storage pool during a hot-swap operation, comprising:
   managing a storage pool comprising a logical collection of storage devices constructed from a local storage device of a plurality of nodes, the storage pool being manage at a node of the plurality of nodes having a local service virtual machine, wherein the local service virtual machine receive an input/output request from another service virtual machine through a corresponding hypervisor; and
   in response to an initiation of a hot-swap operation at a node of the plurality of nodes:
      performing pass-thru of a storage manager to a service virtual machine at the node, and
      servicing, by the service virtual machine at the node, an input/output request received from another service virtual machine during the hot-swap operation, wherein the service virtual machine performs a read or write operation corresponding to the input/output request without the input/output request going through a storage software layer of the corresponding hypervisor at the node during the hot-swap operation.

2. The method of claim 1, wherein the input/output request is an IP-based request.

3. The method of claim 1, wherein a portion of the storage pool is exposed by the service virtual machine as a virtual disk to a virtual machine.

4. The method of claim 1, wherein a virtual disk exposes a portion of the storage pool to a virtual machine via an internet small computer system interface.

5. The method of claim 1, wherein the local storage device of the plurality of nodes is within or directly attached to the respective node of the plurality of nodes.

6. The method of claim 1, wherein a first node of the plurality of nodes has a first hypervisor from a first virtualization vendor, and a second node of the plurality of nodes has a second hypervisor from a second virtualization vendor, wherein the first hypervisor and the second hypervisor are different hypervisors from different virtualization vendors.

7. The method of claim 1, wherein the logical collection of storage devices is further constructed from a networked storage device.

8. The method of claim 1, wherein performing pass-thru comprises configuring a driver of the service virtual machine to support communication with the logical collection of storage devices.

9. The method of claim 1, further comprising running an in-memory storage device in the corresponding hypervisor which is accessed by the service virtual machine.

10. The method of claim 1, wherein performing the hot-swap operation is in response to a storage device failing.

11. A computer program product embodied on a non-transitory computer readable medium for maintaining access to a storage pool during a hot-swap operation, the computer readable medium having stored thereon a sequence of instructions which, when executed by a processor causes the processor perform a set of acts, the set of acts comprising:
    managing a storage pool comprising a logical collection of storage devices constructed from a local storage device of a plurality of nodes, the storage pool being manage at a node of the plurality of nodes having a local service virtual machine, wherein the local service virtual machine receive an input/output request from another service virtual machine through a corresponding hypervisor; and
    in response to an initiation of a hot-swap operation at a node of the plurality of nodes:
       performing pass-thru of a storage manager to a service virtual machine at the node, and
       servicing, by the service virtual machine at the node, an input/output request received from another service virtual machine during the hot-swap operation, wherein the service virtual machine performs a read or write operation corresponding to the input/output request without the input/output request going through a storage software layer of the corresponding hypervisor at the node during the hot-swap operation
       hypervisor at the node during the hot-swap operation.

12. The computer program product of claim 11, wherein the input/output request is an IP-based request.

13. The computer program product of claim 11, wherein a portion of the storage pool is exposed by the service virtual machine as a virtual disk to a virtual machine.

14. The computer program product of claim 11, wherein a virtual disk exposes a portion of the storage pool to a virtual machine via an internet small computer system interface.

15. The computer program product of claim 11, wherein the local storage device of the plurality of nodes is within or directly attached to the respective node of the plurality of nodes.

16. The computer program product of claim 11, wherein a first node of the plurality of nodes has a first hypervisor from a first virtualization vendor, and a second node of the plurality of nodes has a second hypervisor from a second virtualization vendor, wherein the first hypervisor and the second hypervisor are different hypervisors from different virtualization vendors.

17. The computer program product of claim 11, wherein the logical collection of storage devices is further constructed from a networked storage device.

18. The computer program product of claim 11, wherein performing pass-thru comprises configuring a driver of the service virtual machine to support communication with the logical collection of storage devices.

19. The computer program product of claim 11, the set of acts further comprising running an in-memory storage device in the corresponding hypervisor which is accessed by the service virtual machine.

20. The computer program product of claim 11, wherein performing the hot-swap operation is in response to a storage device failing.

\* \* \* \* \*